United States Patent
Yang

(10) Patent No.: US 8,203,303 B2
(45) Date of Patent: Jun. 19, 2012

(54) ASYNCHRONOUS AC INDUCTION ELECTRICAL MACHINES IN CROSS-INTERLOCKINGLY PARALLEL CONNECTION

(76) Inventor: Tai-Her Yang, Dzan-Hwa (TW)

( * ) Notice: Subject to any disclaimer, the term of this patent is extended or adjusted under 35 U.S.C. 154(b) by 529 days.

(21) Appl. No.: 12/382,951

(22) Filed: Mar. 27, 2009

(65) Prior Publication Data

US 2010/0148716 A1 Jun. 17, 2010

Related U.S. Application Data

(63) Continuation-in-part of application No. 12/314,628, filed on Dec. 15, 2008, now abandoned.

(51) Int. Cl.
*H02P 1/24* (2006.01)
(52) U.S. Cl. .......... 318/727; 318/730; 318/700
(58) Field of Classification Search .......... 318/302, 318/727, 730, 700, 34, 49, 42, 46, 47; 310/112
See application file for complete search history.

(56) References Cited

U.S. PATENT DOCUMENTS 6,539,782 B1 * 4/2003 Drecq et al. .......... 73/116.05
* cited by examiner

*Primary Examiner* — Karen Masih
(74) *Attorney, Agent, or Firm* — Bacon & Thomas, PLLC

(57) ABSTRACT

At least two asynchronous AC induction electrical machines in series connection with the power source are respectively made with the main winding and control winding for operating the electrical machines, wherein the individually driven loading operations of the two electrical machines in cross-interlockingly series connection being series connected with the power source are led by the changes of individual electrical machine driving loading statuses to appear variable impedance operation so as to change the end voltage ratio between individual electrical machines in cross-interlockingly series connections.

17 Claims, 5 Drawing Sheets

ASYNCHRONOUS AC INDUCTION ELECTRICAL MACHINES IN CROSS-INTERLOCKINGLY PARALLEL CONNECTION

BACKGROUND OF THE INVENTION (a) Field of the Invention

The present invention innovatively discloses that at least two asynchronous AC induction electrical machines (hereinafter referred to as electrical machine) in series connection with the power source are respectively installed with main winding and control winding for electrical machine operation, wherein the two electrical machines being combined by taking the example of cross-interlockingly series connection comprises the following:

The first electrical machine control winding and the first electrical machine main winding are windingly installed on the same polar axis or windingly installed at electrical angle between polar axes within the first electrical machine, wherein the two electrical machines are optionally operated in cross-interlockingly series connection according to operating requirements of the polarity relationship between the two to appear 1) additional exciting operation in the same polarities, or 2) differential exciting operation in reverse polarities;

The second electrical machine control winding and the second electrical machine main winding are windingly installed on the same polar axis or windingly installed at electrical angle between polar axes within the second electrical machine wherein the two electrical machines are optionally operated in cross-interlockingly series connection according to operating requirements of the polarity relationship between the two to appear 1) additional exciting operation in the same polarities, or 2) differential exciting operation in reverse polarities;

The first electrical machine main winding is the main operating winding of the first electrical machine, while the first terminal of the first electrical machine control winding is connected with the second terminal of the second electrical machine main winding installed in the second electrical machine;

The second electrical machine main winding is the main operating winding of the second electrical machine, wherein the first terminal of the second electrical machine control winding is connected with the second terminal of the first electrical machine main winding installed in the first electrical machine;

The first terminal of the first electrical machine main winding is connected with the second terminal of the first electrical machine control winding;

The first terminal of the second electrical machine main winding and the second terminal of the second electrical machine control winding are respectively connected with the power source for input or output electric power;

The windings of said first electrical machine and second electrical machine are series connected and are driven by the power source, wherein the operation effect of the first electrical machine and the second electrical machine being cross-interlockingly series connected to drive the load individually is led by the changes of individual electrical machine driving loading statuses to appear variable impedance operation so as to change the end voltage ratio between individual electrical machines in cross-interlockingly series connections thereby allowing each individual electrical machine to produce interaction of required electromagnetic effect;

Especially for the application of disposing multiple asynchronous AC induction electrical machines to drive a common load, when the common load varies unstable against the loads imposed by individual asynchronous AC induction electrical machines, such as the embodiment of using individual asynchronous AC induction electrical machines to drive different wheels, the load at the wheels on both sides will vary accordingly when the vehicle is making a turn, or the embodiment of the tram connecting multiple coaches to constitute a common load being disposed individual asynchronous AC induction electrical machines on individual coaches to drive the coaches individually, when the tram is speeding, decelerating or climbing up/down slopes, the common load varies according to the load imposed by individually disposed asynchronous AC induction electrical machines, the real time response and adjustment between individual asynchronous AC induction electrical machines is very important; conventional solution is through the individual detecting device installed on individual asynchronous AC induction electrical machines to deliver the signal of load variations to the central controller, then the drive control device disposed on individual asynchronous AC induction electrical machines is subject to the control of the central controller, so that to control the corresponding operation performance of individual asynchronous AC induction electrical machines; the conventional solution has the drawback of complicated system, lower reliability, and longer response adjustment time period required between individual asynchronous AC induction electrical machines, therefore when applied to the tram connecting multiple coaches to constitute the common load as aforementioned, the individual coaches are prone to generate jostle phenomenon;

The present invention innovatively discloses that the asynchronous AC induction electrical machines in cross-interlockingly series connection is through the windings of multiple asynchronous AC induction electrical machines to crossly interlock and generate random adjustment of the operation performance according to the load variations, thereby having the advantages of simplifying the system, increasing the reliability as well as shortening the response adjustment time period of asynchronous AC induction electrical machines to load variations, so that to promote the stability of the system.

(b) Description of the Prior Art

When multiple units of conventional asynchronous AC induction electrical machines being series connected for motor or generator function are individually operated to drive the load, the individual electrical machines can only follow the variations of individual load-driven statuses to appear variable impedance operation so as to mutually affect their end voltages but unable to produce interaction of particular electromagnetic effect.

SUMMARY OF THE INVENTION

The present invention innovatively discloses that at least two asynchronous AC induction electrical machines (hereinafter referred to as electrical machine) in series connection with the power source are respectively installed with main winding and control winding for electrical machine operation, take example for the two electrical machines in cross-interlockingly series connection, wherein the first electrical machine main winding is the main operating winding of the first electrical machine, while the first electrical machine control winding is series connected with the second electrical machine main winding of the second electrical machine, the first electrical machine control winding and the first electrical machine main winding are windingly installed on the same polar axis or windingly installed at electrical angle between polar axes within the first electrical machine, wherein the two electrical machines are optionally operated in cross-interlockingly series connection according to operating requirements of the polarity relationship between the two to appear 1) additional exciting operation in the same polarities, or 2) differential exciting operation in reverse polarities; the second electrical machine main winding being relatively installed within the second electrical machine is the main operating winding of the first electrical machine, while the second electrical machine control winding is series connected with the first electrical machine main winding of the first electrical machine, the second electrical machine control winding and the second electrical machine main winding are windingly installed on the same polar axis or windingly installed at electrical angle between polar axes within the second electrical machine wherein the two electrical machines are optionally operated in cross-interlockingly series connection according to operating requirements of the polarity relationship between the two to appear 1) additional exciting operation in the same polarities, or 2) differential exciting operation in reverse polarities, wherein the electrical machine in series connection with the power source being individually driven in loading operation causes the cross-interlockingly series connected electrical machine to appear variable impedance operation following variations of individual load-driven statuses of individual electrical machines thereby changing the end voltage ratio between individual electrical machines in cross-interlockingly series connection to let each individual electrical machine produce required interactive reactions by electrical machine effect.

Especially for the application of disposing multiple asynchronous AC induction electrical machines to drive a common load, when the common load varies unstable against the loads imposed by individual asynchronous AC induction electrical machines, such as the embodiment of using individual asynchronous AC induction electrical machines to drive different wheels, the load at the wheels on both sides will vary accordingly when the vehicle is making a turn, or the embodiment of the tram connecting multiple coaches to constitute a common load being disposed individual asynchronous AC induction electrical machines on individual coaches to drive the coaches individually, when the tram is speeding, decelerating or climbing up/down slopes, the common load varies according to the load imposed by individually disposed asynchronous AC induction electrical machines, the real time response and adjustment between individual asynchronous AC induction electrical machines is very important. Conventional solution is through the individual detecting device installed on individual asynchronous AC induction electrical machines to deliver the signal of load variations to the central controller, then the drive control device disposed on individual asynchronous AC induction electrical machines is subject to the control of the central controller, so that to control the corresponding operation performance of individual asynchronous AC induction electrical machines; the conventional solution has the drawback of complicated system, lower reliability, and longer response adjustment time period required between individual asynchronous AC induction electrical machines, therefore when applied to the tram connecting multiple coaches to constitute the common load as aforementioned, the individual coaches are prone to generate jostle phenomenon;

The present invention innovatively discloses that the asynchronous AC induction electrical machines in cross-interlockingly series connection is through the windings of multiple asynchronous AC induction electrical machines to crossly interlock and generate random adjustment of the operation performance according to the load variations, thereby having the advantages of simplifying the system, increasing the reliability as well as shortening the response adjustment time period of asynchronous AC induction electrical machines to load variations so that to promote the stability of the system.

In practical applications, the asynchronous AC induction electrical machines in cross-interlockingly series connection of present invention include the following:

The electrical specifications and characteristics of the main windings installed within respective individual asynchronous AC induction electrical machines can be the same or different;

The electrical specifications and characteristics of the control windings installed within respective individual asynchronous AC induction electrical machines can be the same or different;

The rated specifications and operating characteristics of respective individual asynchronous AC induction electrical machines can be the same or different;

The individual electrical machines can be constituted by asynchronous AC induction electrical machines having the same or different structural types and different operating characteristics;

For the asynchronous AC induction electrical machines in cross-interlockingly series connection of present invention, the individual electrical machines being mutually series connected are directly driven by AC electric power source, including AC single phase or multiple phase power sources, or DC to AC power source, wherein the power source can be fixed or modulated by voltage, frequency, or frequency and voltage together for rotational speed, rotating torque, rotational direction, or power regeneration braking operations, or used as the coupling transmission device under asynchronous electromagnetic effect for transmission operation.

DESCRIPTION OF MAIN COMPONENT SYMBOLS

Figure 1:
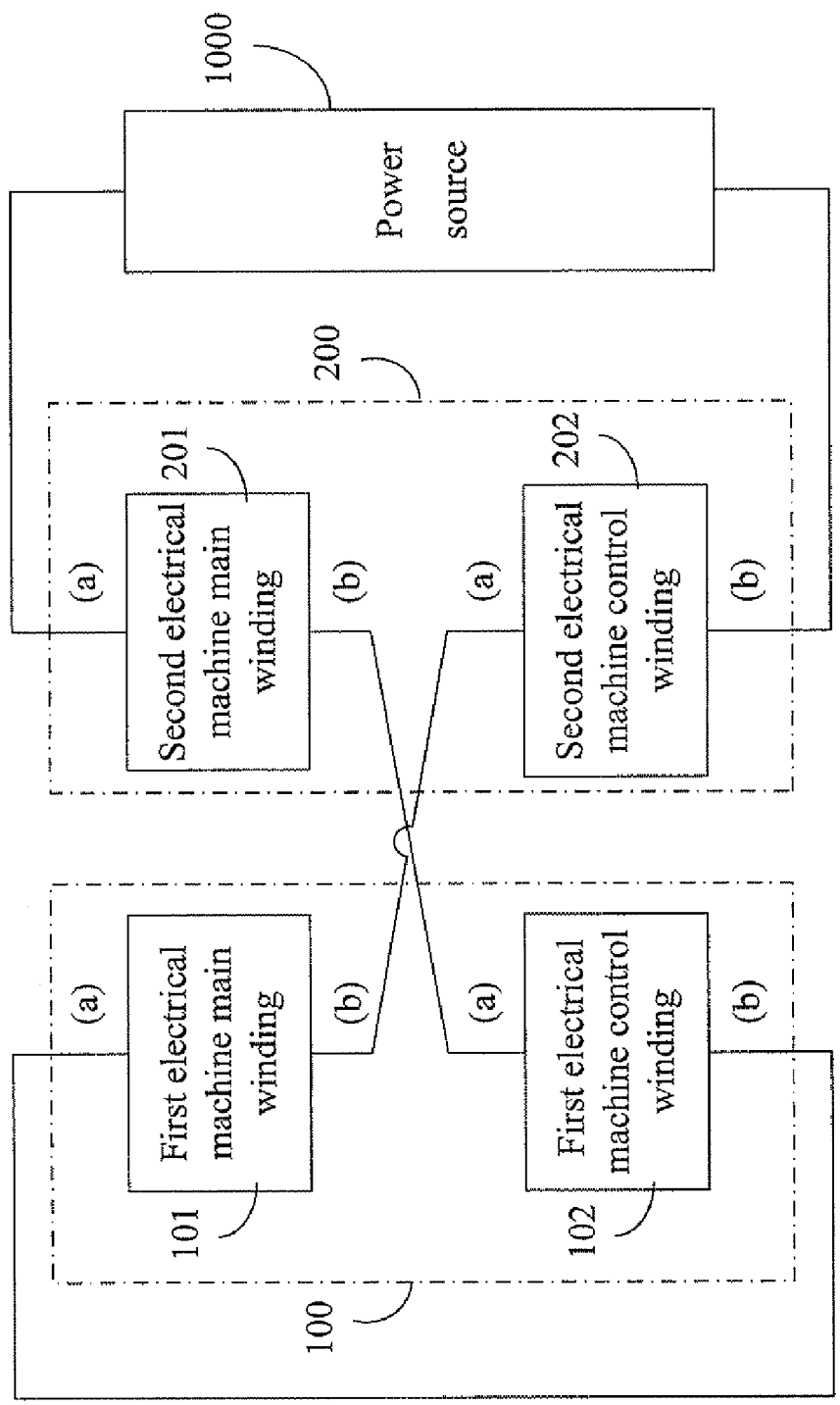
FIG. 1 is a structural schematic view of asynchronous AC induction electrical machines in cross-interlockingly series connection of the present invention comprising two asynchronous AC induction electrical machines in series connection.

100: First electrical machine
101: First electrical machine main winding 102: First electrical machine control winding
200: Second electrical machine
201: Second electrical machine main winding
202: Second electrical machine control winding
300: Third electrical machine
301: Third electrical machine main winding
302: Third electrical machine control winding
1000: Power source
3100: First 3-phase electrical machine
3101: First 3-phase electrical machine main winding
3102: First 3-phase electrical machine control winding
3200: Second 3-phase electrical machine
3201: Second 3-phase electrical machine main winding
3202: Second 3-phase electrical machine control winding

DETAILED DESCRIPTION OF THE PREFERRED EMBODIMENTS

The principle of the present invention is delineated in the following: FIG. 1 is a structural schematic view of asynchronous AC induction electrical machines in cross-interlockingly series connection of the present invention comprising two asynchronous AC induction electrical machines in series connection.

As shown in FIG. 1, the cross-interlocked series connected circuit is driven by power source (1000) which includes AC single phase or multiple phase power sources, or DC to AC power source; the power source can be fixed or modulated by voltage, frequency, or frequency and voltage together.

The present invention innovatively discloses that at least two asynchronous AC induction electrical machines (hereinafter referred to as electrical machine) in series connection with the power source are respectively installed with main winding and control winding for electrical machine operation, wherein the two electrical machines in cross-interlockingly series connection is taken as the example to constitute the following:

The first electrical machine main winding (101) is the main operating winding of the first electrical machine (100), while terminal (a) of the first electrical machine control winding (102) is series connected with terminal (b) of the second electrical machine main winding (201) of the second electrical machine (200), the first electrical machine control winding (102) and the first electrical machine main winding (101) are windingly installed on the same polar axis or windingly installed at electrical angle between polar axes within the first electrical machine (100), wherein the two electrical machines (100, 200) are optionally operated in cross-interlockingly series connection according to operating requirements of the polarity relationship between the two to appear 1) additional exciting operation in the same polarities, or 2) differential exciting operation in reverse polarities;

The second electrical machine main winding (201) being installed within the second electrical machine (200) is the main operating winding of the second electrical machine (200), while terminal (a) of the second electrical machine control winding (202) is series connected with terminal (b) of the first electrical machine main winding (101) of the first electrical machine (100), the second electrical machine control winding (202) and the second electrical machine main winding (101) are windingly installed on the same polar axis or windingly installed at electrical angle between polar axes within the second electrical machine (200) wherein the two electrical machines are optionally operated in cross-interlockingly series connection according to operating requirements of the polarity relationship between the two to appear 1) additional exciting operation in the same polarities, or 2) differential exciting operation in reverse polarities;

The terminal (a) of second electrical machine main winding (201) and terminal (b) of second electrical machine control winding (202) of the second electrical machine (200) are connected to the power source (1000); the terminal (a) of the first electrical machine main winding (101) of the first electrical machine (100) is connected with terminal (b) of the first electrical machine control winding (102), wherein the two electrical machines (100, 200) are firstly series connected before connected to the power source, and the cross-interlockingly series connected two electrical machines (100, 200) during the operation of individually driven loadings appear variable impedance operation following variations of individual load-driven statuses of individual electrical machines thereby changing the end voltage ratio between individual electrical machines in cross-interlockingly series connection to let each relatively mutually interlockingly series connected individual electrical machine produce the required interactive reactions by electrical machine effect.

In electricity discharge operation, if the current is changed due to loading variation of the first electrical machine (100), then exciting current of the second electrical machine control winding (202) of the second electrical machine (200) being series connected with the first electrical machine main winding (101) is simultaneously varied, so that the synthetic magnetic flux between the second electrical machine main winding (201) and the second electrical machine control winding (202) is varied according to polarity relationship, positional relationship of polar axis electrical angle, and phase relationship of exciting current between the two thereby allowing the torque and rotational speed of the second electrical machine (200) to be adjusted following the changes of its own end voltage and loading as well as the changes of operating current at the first electrical machine main winding (101) of the first electrical machine (100) being series connected with the second electrical machine control winding (202) simultaneously; on the contrary, if the current is changed due to loading variation of the second electrical machine (200), then exciting current of the first electrical machine control winding (102) of the first electrical machine (100) being series connected with the second electrical machine main winding (201) is simultaneously varied, so that the synthetic magnetic flux between the first electrical machine main winding (101) and the first electrical machine control winding (102) is varied according to polarity relationship, positional relationship of polar axis electrical angle, and phase relationship of exciting current between the two thereby allowing the torque and rotational speed of the first electrical machine (100) to be adjusted following changes of its own end voltage and loading and changes of operating current at the second electrical machine main winding (201) of the second electrical machine (200) being series connected with the first electrical machine control winding (102) simultaneously.

Figure 2:
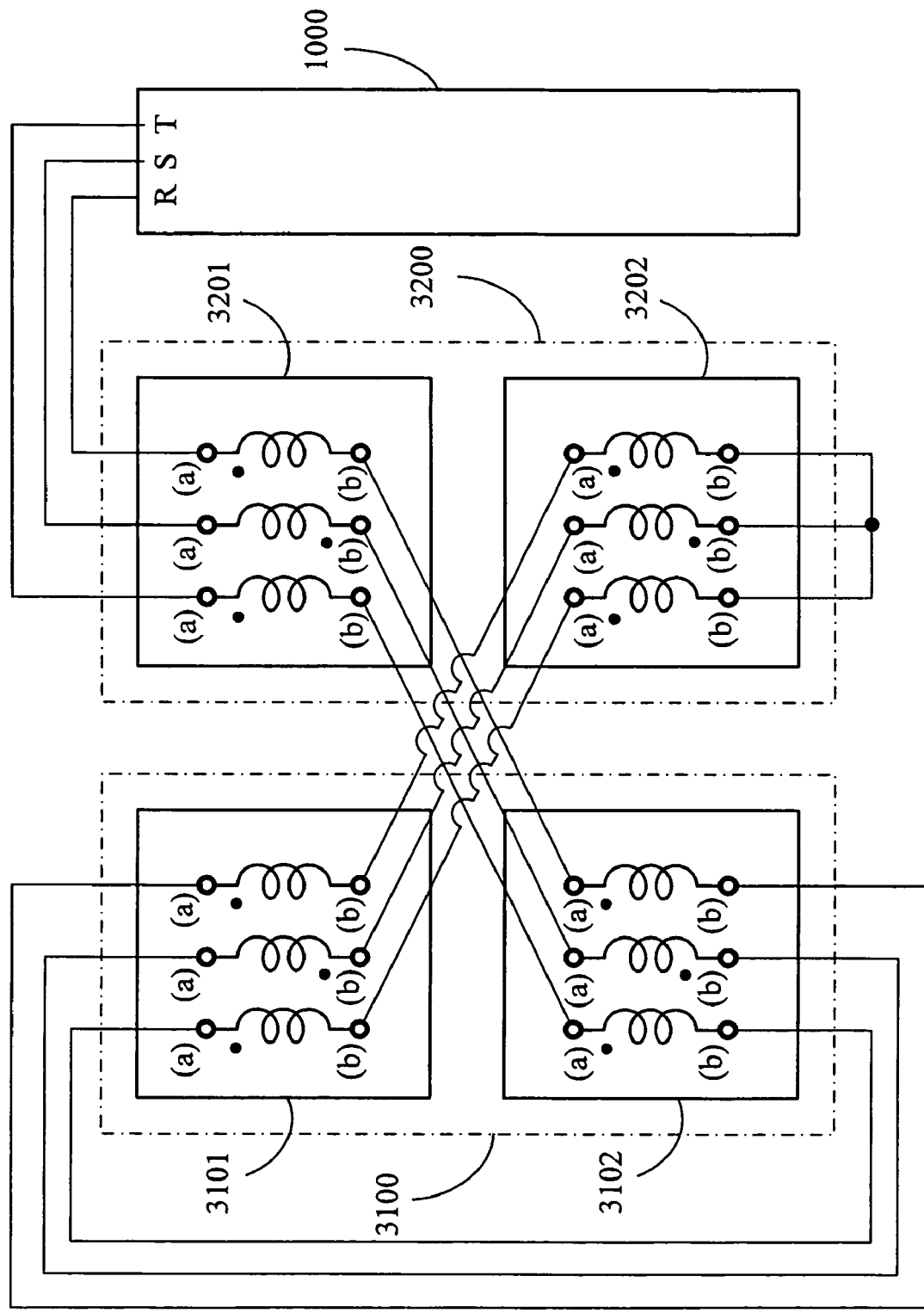
FIG. 2 is a schematic view of the embodiment of the present invention showing that two 3-phase asynchronous AC induction electrical machines being driven by the 3-phase power source are in Y series connection.

FIG. 2 is a schematic view of the embodiment of the present invention showing that two 3-phase asynchronous AC induction electrical machines being driven by the 3-phase power source are in Y series connection.

Wherein:

The first 3-phase electrical machine control winding (3102) and the first 3-phase electrical machine main winding (3101) are windingly installed on the same polar axis or windingly installed at electrical angle between polar axes within the first 3-phase electrical machine (3100), wherein the two electrical machines (3100, 3200) are optionally operated in cross-interlockingly series connection according to operating requirements of the polarity relationship between the two to appear 1) additional exciting operation in the same polarities, or 2) differential exciting operation in reverse polarities;

The second 3-phase electrical machine control winding (3202) and the second 3-phase electrical machine main winding (3201) are windingly installed on the same polar axis or windingly installed at electrical angle between polar axes within the second 3-phase electrical machine (3200), wherein the two electrical machines (3100, 3200) are optionally operated in cross-interlockingly series connection according to operating requirements of the polarity relationship between the two to appear 1) additional exciting operation in the same polarities, or 2) differential exciting operation in reverse polarities;

The first 3-phase electrical machine main winding (3101) is the main operating winding of the first 3-phase electrical machine (3100), wherein terminal (a) of each phase winding of the first 3-phase electrical machine control winding (3102) is connected with terminal (b) of each phase winding of the second 3-phase electrical machine main winding (3201) being installed within the second 3-phase electrical machine (3200);

The second 3-phase electrical machine main winding (3201) is the main operating winding of the second 3-phase electrical machine (3200), wherein terminal (a) of each phase winding of the second 3-phase electrical machine control winding (3202) is connected with terminal (b) of each phase winding of the first 3-phase electrical machine main winding (3101) being installed within the first 3-phase electrical machine (3100);

The terminal (a) of each phase winding of the first 3-phase electrical machine main winding (3101) is connected with terminal (b) of each phase winding of the first 3-phase electrical machine control winding (3102);

The terminal (a) of each phase winding of the second 3-phase electrical machine main winding (3201) is connected to terminals R.S.T. of the 3-phase power source, the terminal (b) of each phase winding of the second 3-phase electrical machine control winding (3202) is in Y connection;

Said first 3-phase electrical machine (3100) and said second 3-phase electrical machine (3200) are driven by the AC 3-phase power source (1000), wherein the first 3-phase electrical machine (3100) and the second 3-phase electrical machine (3200) in the operation of individually driven loadings are by the effect of cross-interlockingly series connected operation to appear variable impedance operation according to the changes of individual electrical machine driving loading statuses so as to change the end voltage ratio between individual electrical machines in cross-interlockingly series connections thereby allowing each individual electrical machine to produce interaction of required electromagnetic effect.

Figure 3:
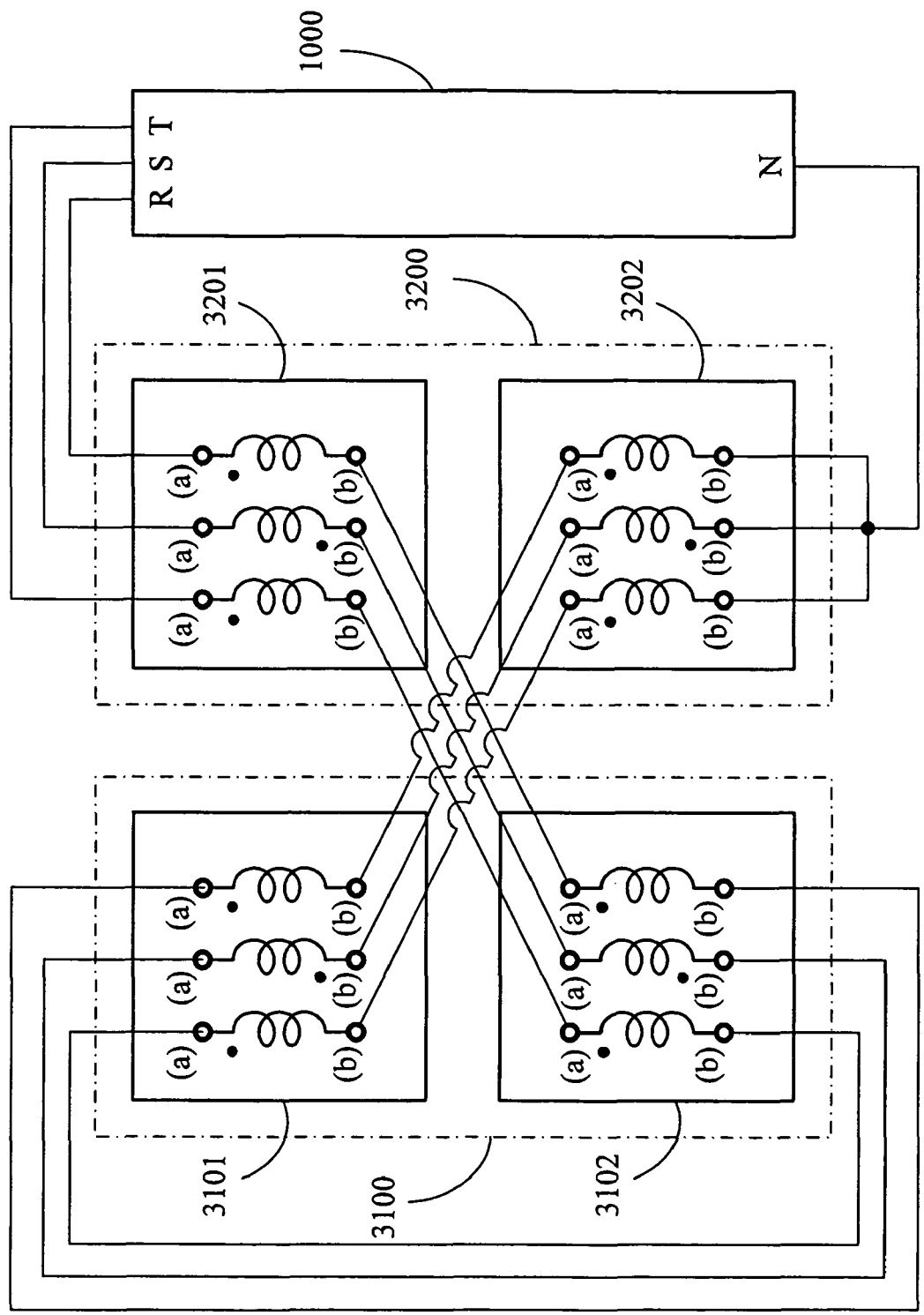
FIG. 3 is a schematic view of the embodiment of the present invention showing that two 3-phase asynchronous AC induction electrical machines being driven by the 3-phase 4-wire power source are in 3-phase 4 wire Y series connection.

FIG. 3 is a schematic view of the embodiment of the present invention showing that two 3-phase asynchronous AC induction electrical machines being driven by the 3-phase 4-wire power source are in 3-phase 4-wire Y series connection.

wherein:

The first 3-phase electrical machine control winding (3102) and the first 3-phase electrical machine main winding (3101) are windingly installed on the same polar axis or windingly installed at electrical angle between polar axes within the first 3-phase electrical machine (3100), wherein the two electrical machines (3100, 3200) are optionally operated in cross-interlockingly series connection according to operating requirements of the polarity relationship between the two to appear 1) additional exciting operation in the same polarities, or 2) differential exciting operation in reverse polarities;

The second 3-phase electrical machine control winding (3202) and the second 3-phase electrical machine main winding (3201) are windingly installed on the same polar axis or windingly installed at electrical angle between polar axes within the second 3-phase electrical machine (3200), wherein the two electrical machines (3100, 3200) are optionally operated in cross-interlockingly series connection according to operating requirements of the polarity relationship between the two to appear 1) additional exciting operation in the same polarities, or 2) differential exciting operation in reverse polarities;

The first 3-phase electrical machine main winding (3101) is the main operating winding of the first 3-phase electrical machine (3100), wherein terminal (a) of each phase winding of the first 3-phase electrical machine control winding (3102) is connected with terminal (b) of each phase winding of the second 3-phase electrical machine main winding (3201) being installed within the second 3-phase electrical machine (3200);

The second 3-phase electrical machine main winding (3201) is the main operating winding of the second 3-phase electrical machine (3200), wherein terminal (a) of each phase winding of the second 3-phase electrical machine control winding (3202) is connected with terminal (b) of each phase winding of the first 3-phase electrical machine main winding (3101) being installed within the first 3-phase electrical machine (3100);

The terminal (a) of each phase winding of the first 3-phase electrical machine main winding (3101) is connected with terminal (b) of each phase winding of the first 3-phase electrical machine control winding (3102);

The terminal (a) of each phase winding of second 3-phase electrical machine main winding (3201) is connected to terminals R.S.T. of the AC 3-phase 4-wire power source; terminal (b) of each phase winding of second 3-phase electrical machine control winding (3202) being in Y connection is connected to the neutral terminal N of the AC 3-phase 4-wire power source;

Said first 3-phase electrical machine (3100) and said second 3-phase electrical machine (3200) are driven by the AC 3-phase 4-wire power source (1000), wherein the first 3-phase electrical machine (3100) and the second 3-phase electrical machine (3200) in the operation of individually driven loadings are by the effect of cross-interlockingly series connected operation to appear variable impedance operation according to the changes of individual electrical machine driving loading statuses so as to change the end voltage ratio between individual electrical machines in cross-interlockingly series connections thereby allowing each individual electrical machine to produce interaction of required electromagnetic effect.

Figure 4:
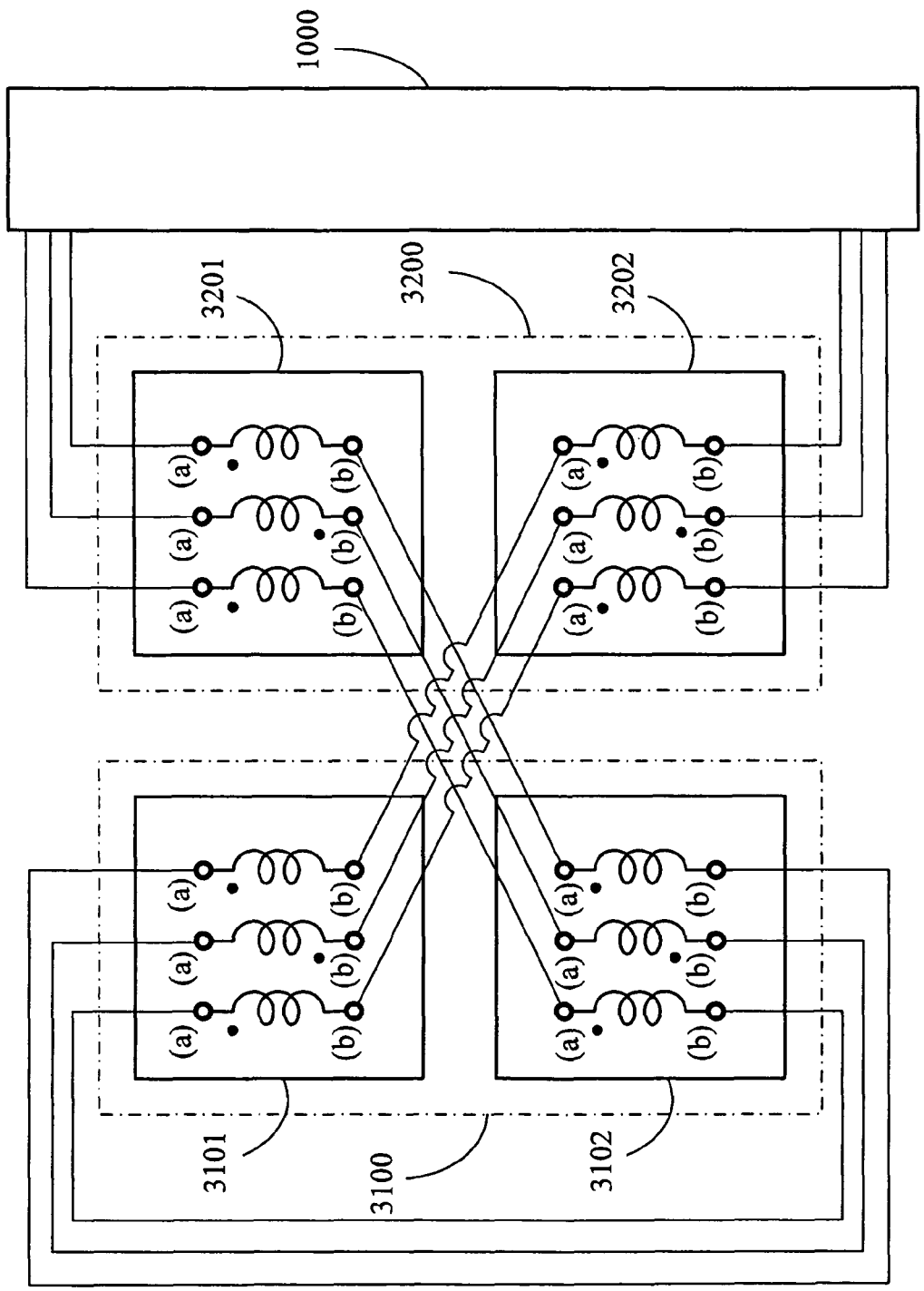
FIG. 4 is a schematic view of the embodiment of the present invention showing that two 3-phase asynchronous AC induction electrical machines being driven by the 3-phase power source are in □ series connection.

FIG. 4 is a schematic view of the embodiment of the present invention showing that two 3-phase asynchronous AC induction electrical machines being driven by the AC 3-phase power source are in □ series connection.

wherein:

The first 3-phase electrical machine control winding (3102) and the first 3-phase electrical machine main winding (3101) are windingly installed on the same polar axis or windingly installed at electrical angle between polar axes within the first 3-phase electrical machine (3100), wherein the two electrical machines (3100, 3200) are optionally operated in cross-interlockingly series connection according to operating requirements of the polarity relationship between the two to appear 1) additional exciting operation in the same polarities, or 2) differential exciting operation in reverse polarities;

The second 3-phase electrical machine control winding (3202) and the second 3-phase electrical machine main winding (3201) are windingly installed on the same polar axis or windingly installed at electrical angle between polar axes within the second 3-phase electrical machine (3200), wherein the two electrical machines (3100, 3200) are optionally operated in cross-interlockingly series connection according to operating requirements of the polarity relationship between the two to appear 1) additional exciting operation in the same polarities, or 2) differential exciting operation in reverse polarities;

The first 3-phase electrical machine main winding (3101) is the main operating winding of the first 3-phase electrical machine (3100), wherein terminal (a) of each phase winding of the first 3-phase electrical machine control winding (3102) is connected with terminal (b) of each phase winding of the second 3-phase electrical machine main winding (3201) being installed within the second 3-phase electrical machine (3200);

The second 3-phase electrical machine main winding (3201) is the main operating winding of the second 3-phase electrical machine (3200), wherein terminal (a) of each phase winding of the second 3-phase electrical machine control winding (3202) is connected with terminal (b) of each phase winding of the first 3-phase electrical machine main winding (3101) being installed within the first 3-phase electrical machine (3100);

The terminal (a) of each phase winding of the first 3-phase electrical machine main winding (3101) is connected with terminal (b) of each phase winding of the first 3-phase electrical machine control winding (3102);

The terminal (a) of each phase winding of the second 3-phase electrical machine main winding (3201) and terminal (b) of each phase winding of the second 3-phase electrical machine control winding (3202) are in Δ connection and further connected to terminals R.S.T. of the AC 3-phase power source (1000);

Said first 3-phase electrical machine (3100) and said second 3-phase electrical machine (3200) are driven by the AC 3-phase power source (1000), wherein the first 3-phase electrical machine (3100) and the second 3-phase electrical machine (3200) in the operation of individually driven loadings are by the effect of cross-interlockingly series connected operation to appear variable impedance operation according to the changes of individual electrical machine driving loading statuses so as to change the end voltage ratio between individual electrical machines in cross-interlockingly series connections thereby allowing each individual electrical machine to produce interaction of required electromagnetic effect.

Figure 5:
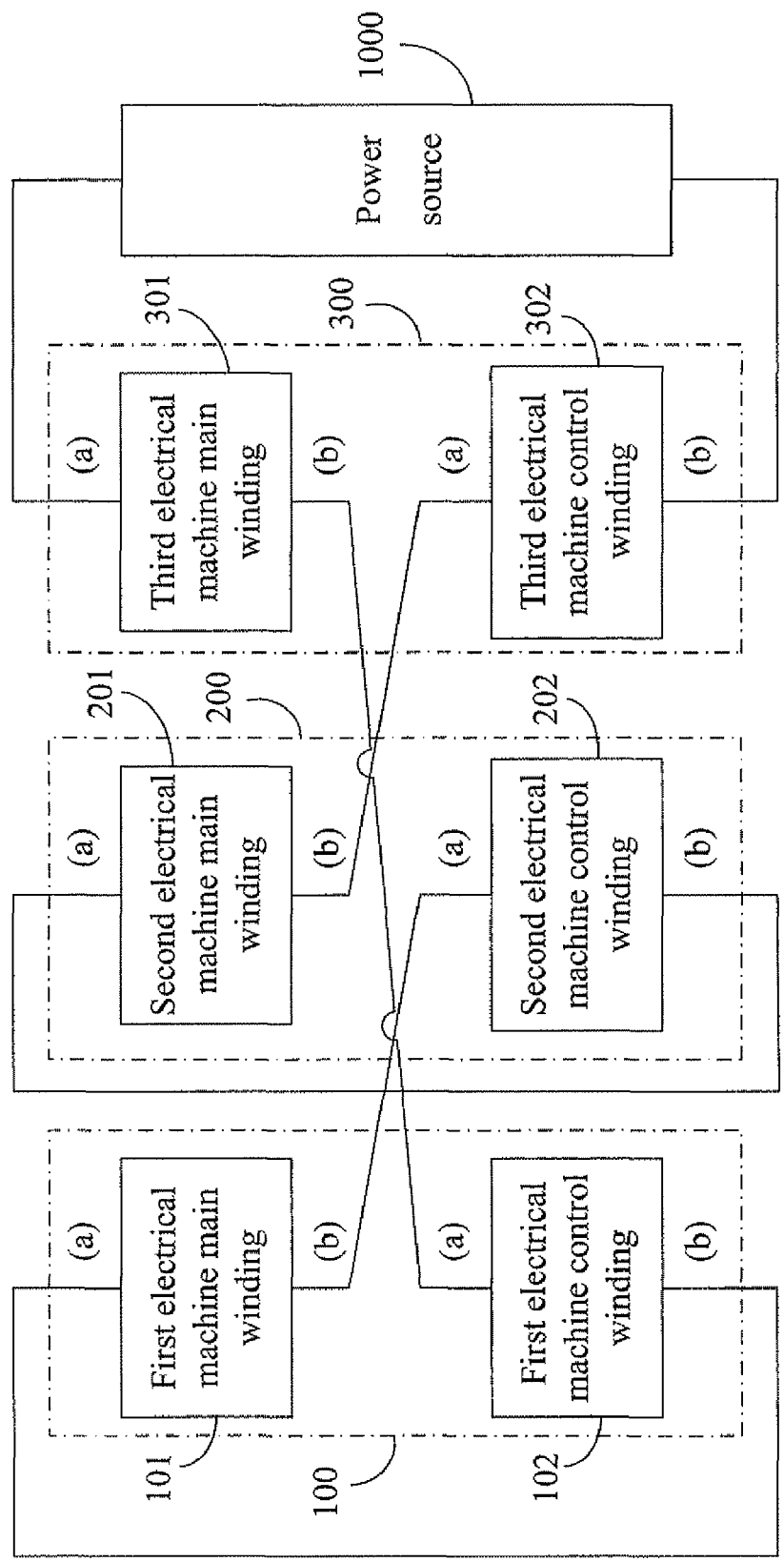
FIG. 5 is a structural schematic view of the asynchronous AC induction electrical machines in cross-interlockingly series connection of the present invention comprising three asynchronous AC induction electrical machines in series connection.

The aforesaid principles can also be applied to multiple electrical machines, such as that FIG. 5 is a structural schematic view of the asynchronous AC induction electrical machines in cross-interlockingly series connection of the present invention comprising three asynchronous AC induction electrical machines in series connection; as shown in FIG. 5:

The magnetic field of the first electrical machine (100) is windingly installed with the first electrical machine main winding (101) and windingly installed with the first electrical machine control winding (102) on the same polar axis or at electrical angle between polar axes, wherein terminal (a) of the first electrical machine control winding (102) is series connected with terminal (b) of the third electrical machine main winding (301) being windingly installed within the third electrical machine (300); the magnetic field of the second electrical machine (200) is windingly installed with the second electrical machine main winding (201) and windingly installed with the second electrical machine control winding (202) on the same polar axis or at electrical angle between polar axes, wherein terminal (a) of the second electrical machine control winding (202) is series connected with terminal (b) of the first electrical machine main winding (101) being windingly installed within the first electrical machine (100); the magnetic field of the third electrical machine (300) is windingly installed with the third electrical machine main winding (301) and windingly installed with the third electrical machine control winding (302) on the same polar axis or at electrical angle between polar axes, wherein terminal (a) of the third electrical machine control winding (302) is series connected with terminal (b) of the second electrical machine main winding (201) being windingly installed within the second electrical machine (200);

The terminal (a) of the third electrical machine main winding (301) of the third electrical machine (300) and terminal (b) of the third electrical machine control winding (302) are connected to the power source (1000); terminal (a) of the first electrical machine main winding (101) of the first electrical machine (100) is connected with terminal (b) of the first electrical machine control winding (102), it is through the combining status of the particular series connections between main windings and control windings of aforesaid three electrical machines being individually powered by the power source (1000) to drive loads and following variations of individual load-driven statuses of individual electrical machines to appear variable impedance operation, and the end voltage ratios between individual electrical machines in cross-interlockingly series connection are hence further changed to allow individual electrical machines to produce required interactive reactions by the electrical machine effect.

For the asynchronous AC induction electrical machines in cross-interlockingly series connection of present invention, if the number of constituting electrical machines is increased, the aforesaid principles and theories can be similarly deducted.

For the asynchronous AC induction electrical machines in cross-interlockingly series connection of present invention, the defined asynchronous AC electrical machine is constituted by rotating magnetic field and the asynchronously actuated interactive body induced by electromagnetic effect.

In practical application, the asynchronous AC induction electrical machines in cross-interlockingly series connection of present invention can be constituted by multiple units of one type or mixed types of squirrel cage type electrical machines or eddy current induction type asynchronous AC electrical machines to include the following combinations according to functional requirements: it is applied 1) for asynchronous AC induction squirrel cage type motor functional operations; or 2) for asynchronous eddy current induction motor functional operations; or 3) for asynchronous AC induction squirrel cage type generator functional operations; or 4) for asynchronous eddy current induction generator functional operations; or 5) for partial generator functional operation and partial motor functional operation; or 6) as the induction squirrel cage type electrical machine braking device; or 7) as the eddy current induction type electrical machine braking device; or 8) as the asynchronous induction squirrel type electromagnetic coupling transmission device; or 9) as the asynchronous eddy current induction type electromagnetic coupling transmission device.

For the asynchronous AC induction electrical machines in cross-interlockingly series connection of present invention, the excitation relationships between the main winding and the control winding in the electrical machine itself include the following:
(1) The main windings and control windings within all electrical machines themselves are installed in the same polarities; or
(2) The main windings and control windings within all electrical machines themselves are installed in reverse polarities; or
(3) The main windings and control windings within partial electrical machines themselves are installed in the same polarities, while the main windings and control windings within partial electrical machines themselves are installed in reverse polarities.

For the asynchronous AC induction electrical machines in cross-interlockingly series connection of present invention, the main winding and control winding within the individual electrical machine are installed on the same polarities or installed at electrical angle difference, wherein the method of installation at electrical angle difference is through control winding passing current to change distribution shape of the magnetic field constituted together with the main magnetic field.

For the asynchronous AC induction electrical machines in cross-interlockingly series connection of present invention, the individual electrical machines are mutually series connected and are directly driven by AC electric power source, including AC single phase or multi-phase power source, or DC to AC power source; wherein the power source is fixedly or voltage modulated, or is commonly modulated by frequency or voltage, or modulated by frequency and voltage simultaneously for rotational speed, rotating torque, rotational direction, or power regeneration braking operations, or used as the coupling transmission device under asynchronous electromagnetic effect for transmission operation.

The invention claimed is:

1. Asynchronous AC induction electrical machines in cross-interlocked series connection, comprising:
   a first electrical machine and a second electrical machine, each said electrical machine having a control winding and a main winding, said control winding and main winding being coaxial or at a predetermined electrical angle difference, and said control winding and main winding having a same polarity for additive excitation or opposite polarities for differential excitation, said main and control windings of the first and second electrical machines being series connected with a power source, as follows:
      a first terminal of the first electrical machine control winding is connected to a second terminal of the second electrical machine main winding,
      a first terminal of the first electrical machine main winding is connected to a second terminal of the first electrical machine control winding,
      a first terminal of the second electrical machine main winding is connected with the power source for input or output of electrical power,
      a second terminal of the second electrical machine control winding is connected with the power source if the second electrical machine is a single phase electrical machine,
      a second terminal of the second electrical machine control winding is connected with the power source, or connected with second terminals of the control winding of each respective phase of the second electrical machine, if the second electrical machine is a multiple phase electrical machine, and
      a second terminal of the first electrical machine main winding is connected to a first terminal of the second electrical machine control winding,
   wherein changes in a load on one of the electrical machines causes changes in impedance in a winding of the other of the electrical machines to change a voltage ratio between the electrical machines.

2. The asynchronous AC induction electrical machines of claim 1, wherein electrical specifications and characteristics of any one or more of the first and second electrical machine main and control windings, or of one or both of the first and second electrical machines, are identical.

3. The asynchronous AC induction electrical machines of claim 1, wherein electrical specifications and characteristics of any one or more of the first and second electrical machine main and control windings, or of one or both of the first and second electrical machines, are different.

4. The asynchronous AC induction electrical machines of claim 1, wherein said power source is a single or multiple phase AC or DC-to-AC power source, wherein an output of the power is fixed or modulated to control a rotational speed, torque, or direction of the electrical machines, carry out regenerative braking operations, or enable the electrical machines to serve as a coupling transmission device.

5. The asynchronous AC induction electrical machines of claim 1, wherein, during an electricity discharge operation:
   when a current in the first electrical machine main winding changes due to a variation in load, an excitation current in the second electrical machine control winding varies simultaneously as at result of the series connection, so that a magnetic flux between the second electrical machine control and main windings varies according to the relative polarities or electrical angle difference relationship between the second electrical machine control and main windings, causing a phase difference between the voltages in the control and main windings and thereby allowing a torque and rotational speed of the second electrical machine to be adjusted in response to the variation in load or changes in current of the first electrical machine main winding, and
   when a current in the second electrical machine changes, a torque and rotational speed of the first electrical machine is correspondingly adjusted in response to the change in current of the second electrical machine main winding.

6. The asynchronous AC induction electrical machines of claim 1, wherein each of said first and second electrical machines is a three-phase asynchronous AC induction electrical machine, and said power source is a three-phase power source.

7. The asynchronous AC induction electrical machines of claim 6, wherein each of said first and second electrical machines is wye-connected.

8. The asynchronous AC induction electrical machines of claim 6, wherein each of said first and second electrical machines is delta-connected.

9. The asynchronous AC induction electrical machines of claim 6, comprising a multiple phase asynchronous induction electrical machine, wherein the main and control windings of each respective phase of the first and second electrical machines are series connected with a power source, as follows:
   a first terminal of the control winding of each respective phase of the first electrical machine is connected to a second terminal of the main winding of each respective phase of the second electrical machine, a first terminal of the main winding of each respective phase of the first electrical machine is connected to a second terminal of the control winding of each respective phase of the first electrical machine, a first terminal of the main winding of each respective phase of the second electrical machine is connected with a respective terminal of the respective phase power source for input or output of electrical power, second terminals of the control winding of each respective phase of the second electrical machine are connected to each other, and a second terminal of the main winding of each respective phase of the first electrical machine is connected to a first terminal of the control winding of each respective phase winding of the second electrical machine.

10. The asynchronous AC induction electrical machines of claim 9, wherein said second terminals of each phase winding of the second electrical machine control winding are connected to a neutral terminal of the power source.

11. The asynchronous AC induction electrical machines of claim 6, wherein the main and control windings of each respective phase of the first and second electrical machines are series connected with a power source, as follows:

a first terminal of the control winding of each respective phase of the first electrical machine is connected to a second terminal of the main winding of each respective phase of the second electrical machine, a first terminal of the main winding of each respective phase of the first electrical machine is connected to a second terminal of the control winding of each respective phase of the first electrical machine, a first terminal of the main winding of each respective phase of the second electrical machine is connected with a respective terminal of the power source for input or output of electrical power, a second terminal of the control winding of each respective phase of the second electrical machine is also connected with a respective terminal of the power source, and a second terminal of the main winding of each respective phase of the first electrical machine is connected to a respective first terminal of the control winding of each respective phase of the second electrical machine.

12. The asynchronous AC induction electrical machines of claim 1, wherein each of said first and second electrical machines is a three-phase, four-wire Y-connected asynchronous AC induction electrical machine and said power source is a three-phase, four-wire Y-connected power source.

13. The asynchronous AC induction electrical machines of claim 1, wherein at least one of the first and second electrical machines includes an interactive body asynchronously actuated by an induced electrical magnetic effect from a rotating magnetic field.

14. The asynchronous AC induction electrical machines of claim 1, wherein at least one of the first and second electrical machines is one of an asynchronous AC induction squirrel cage motor, an asynchronous eddy current induction motor, an asynchronous induction squirrel cage generator, and an asynchronous eddy current induction generator, an asynchronous induction squirrel cage or eddy current motor/generator, and an asynchronous induction squirrel cage or eddy current electromagnetic coupling transmission device.

15. Asynchronous AC induction electrical machines in cross-interlocked series connection, comprising:

a first electrical machine, a second electrical machine, and a third electrical machine, each said electrical machine having a control winding and a main winding, said control winding and main winding being coaxial or at a predetermined electrical angle difference, and said control winding and main winding having a same polarity for additive excitation or opposite polarities for differential excitation, said main and control windings of the first, second, and third electrical machines being series connected with a power source, as follows:

a first terminal of the first electrical machine control winding is connected to a second terminal of the third electrical machine main winding, a first terminal of the second electrical machine control winding is connected to a second terminal of the first electrical machine main winding, and a first terminal of the third electrical machine control winding is connected to a second terminal of the second electrical machine main winding, a first terminal of the first electrical machine main winding is connected to a second terminal of the first electrical machine control winding and a first terminal of the second electrical machine main winding is connected to a second terminal of the second electrical machine control winding, and a first terminal of the third electrical machine main winding and a second terminal of the third electrical machine control winding are connected with the power source for input or output of electrical power, wherein changes in a load on one of the electrical machines causes changes in impedance of windings of the other electrical machines and therefore changes in a voltage ratio between the electrical machines.

16. The asynchronous AC induction electrical machines of claim 15, wherein at least one of the first, second, and third electrical machines is one of an asynchronous AC induction squirrel cage motor, an asynchronous eddy current induction motor, an asynchronous induction squirrel cage generator, and an asynchronous eddy current induction generator, an asynchronous induction squirrel cage or eddy current motor/generator, and an asynchronous induction squirrel cage or eddy current electromagnetic coupling transmission device.

17. The asynchronous AC induction electrical machines of claim 15, further comprising at least one additional electrical machine connected in series fashion between the second and third electrical machines, said first terminal of the third electrical machine control winding being connected to the second terminal of the additional electrical machine main winding rather than to the second terminal of the second electrical machine main winding.

* * * * *